US010860306B2

(12) United States Patent
Velusamy et al.

(10) Patent No.: US 10,860,306 B2
(45) Date of Patent: Dec. 8, 2020

(54) REDUCING DOWNTIME WHEN APPLYING A PATCH TO MULTIPLE DATABASES

(71) Applicant: Dell Products L. P., Round Rock, TX (US)

(72) Inventors: Pratheek Velusamy, Bangalore (IN); Janardhana Korapala, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/054,435

(22) Filed: Aug. 3, 2018

(65) Prior Publication Data

US 2020/0042302 A1     Feb. 6, 2020

(51) Int. Cl.
*G06F 8/65* (2018.01)
*G06F 8/71* (2018.01)
*G06F 11/14* (2006.01)
*G06F 16/23* (2019.01)
*G06F 16/27* (2019.01)

(52) U.S. Cl.
CPC ............... *G06F 8/65* (2013.01); *G06F 8/71* (2013.01); *G06F 11/1433* (2013.01); *G06F 11/1438* (2013.01); *G06F 16/23* (2019.01); *G06F 16/27* (2019.01)

(58) Field of Classification Search
CPC .......... G06F 8/65; G06F 8/71; G06F 8/60–71; G06F 11/1433; G06F 11/1438; G06F 16/23; G06F 16/27
USPC ................................................. 717/168–178
See application file for complete search history.

(56) References Cited

U.S. PATENT DOCUMENTS

| | | | | |
|---|---|---|---|---|
| 7,814,495 B1* | 10/2010 | Lim | ................... | G06F 9/45558 718/104 |
| 8,799,419 B1* | 8/2014 | Lin | ....................... | H04L 45/586 709/220 |
| 9,928,056 B1* | 3/2018 | Chittigala | ............. | G06F 9/5077 |
| 10,146,520 B1* | 12/2018 | Hillyard | .................... | G06F 8/65 |

(Continued)

OTHER PUBLICATIONS

D. Le, J. Xiao, H. Huang and H. Wang, "Shadow patching: Minimizing maintenance windows in a virtualized enterprise environment ," 10th International Conference on Network and Service Management (CNSM) and Workshop, Rio de Janeiro, 2014, pp. 169-174, doi: 10.1109/CNSM.2014.7014154. (Year: 2014).*

*Primary Examiner* — Andrew M. Lyons
(74) *Attorney, Agent, or Firm* — Campbell Stephenson LLP

(57) ABSTRACT

A patching module being executed by a computing device may select a node comprising a first set of instances of a first module, a second set of instances of a second module, and infrastructure software used by the first and second set of instances. The patching module may apply an infrastructure patch to a copy of the infrastructure software to create patched infrastructure. The patching module may stop the first and second set of instances using the infrastructure software and restart the first and second set of instances to use the patched infrastructure. The patching module may determine that a module patch applies to the first module, copy the first module, and apply the module patch to the copy to create a patched module. The patching module may stop the first set of instances of the first module and start a third set of instances of the patched module.

20 Claims, 4 Drawing Sheets

(56) References Cited

U.S. PATENT DOCUMENTS

| | | | |
|---|---|---|---|
| 10,613,914 B2* | 4/2020 | Carlen | G06F 9/54 |
| 2006/0174238 A1* | 8/2006 | Henseler | G06F 8/63 |
| | | | 717/168 |
| 2008/0104588 A1* | 5/2008 | Barber | G06F 8/63 |
| | | | 718/1 |
| 2009/0240791 A1* | 9/2009 | Sakurai | G06F 8/65 |
| | | | 709/221 |
| 2009/0254898 A1* | 10/2009 | Sareen | G06F 8/61 |
| | | | 717/174 |
| 2010/0088281 A1* | 4/2010 | Driesen | G06F 8/65 |
| | | | 707/641 |
| 2011/0138374 A1* | 6/2011 | Pal | G06F 8/656 |
| | | | 717/169 |
| 2013/0205128 A1* | 8/2013 | Thompson | H04L 41/0813 |
| | | | 713/2 |
| 2014/0101646 A1* | 4/2014 | Buzaski | G06F 16/2372 |
| | | | 717/168 |
| 2014/0237464 A1* | 8/2014 | Waterman | G06F 8/65 |
| | | | 717/172 |
| 2015/0189020 A1* | 7/2015 | Cao | H04L 67/1097 |
| | | | 709/226 |
| 2017/0139727 A1* | 5/2017 | Combellas | G06F 8/65 |
| 2017/0192772 A1* | 7/2017 | Islam | G06F 9/5077 |
| 2018/0095518 A1* | 4/2018 | Guo | H04M 1/73 |
| 2018/0101374 A1* | 4/2018 | Chittigala | G06F 8/65 |
| 2018/0260237 A1* | 9/2018 | Noll | G06F 9/45558 |
| 2019/0146780 A1* | 5/2019 | Barrat | G06F 9/45558 |
| | | | 718/102 |
| 2019/0171435 A1* | 6/2019 | Pande | G06F 8/65 |
| 2019/0325056 A1* | 10/2019 | Sloane | G06F 8/60 |

* cited by examiner

REDUCING DOWNTIME WHEN APPLYING A PATCH TO MULTIPLE DATABASES

BACKGROUND OF THE INVENTION

Field of the Invention

This invention relates generally to computing devices and, more particularly to reducing the downtime associated with applying a patch (e.g., to address bugs and/or add new features) to multiple databases in a database system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many businesses (e.g., enterprises) may have a large internal computer network that includes a database system with one or more databases. Each database may have multiple nodes. When a software update is to be applied to the database system, the entire database system may be taken offline, typically for 8 to 10 hours, during which the database is inaccessible. Such a lengthy downtime may adversely affect the business. For example, if the database system hosts one or more e-commerce sites (e.g., including public e-commerce sites and e-commerce sites that are private and accessible to customers of the business via a portal), then the business may lose revenue when the database is offline because new orders cannot be processed. In addition, employees may be incapable of making queries, adding data, modifying data, and running reports, resulting in lost productivity. Thus, patching the database software to provide new features and/or address one or more bugs may be inefficient because the entire database system must be taken offline for many hours when applying the upgrade.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a patching module executed by a computing device may select a node from a plurality of nodes. The node may include a first set of instances of a first module, a second set of instances of a second module, and infrastructure software used by the first set of instances and by the second set of instances. The patching module may copy the infrastructure software to create an infrastructure copy and apply an infrastructure patch to the infrastructure copy to create a patched infrastructure. The patching module may stop the first set of instances of the first module, stop the second set of instances of the second module, restart the first set of instances of the first module to use the patched infrastructure, and restart the second set of instances of the second module to use the patched infrastructure. The patching module may determine that a module patch applies to the first module, copy the first module to create a first copy, and apply the module patch to the first copy to create a patched module. The patching module may stop the first set of instances of the first module and start a third set of instances of the patched module.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
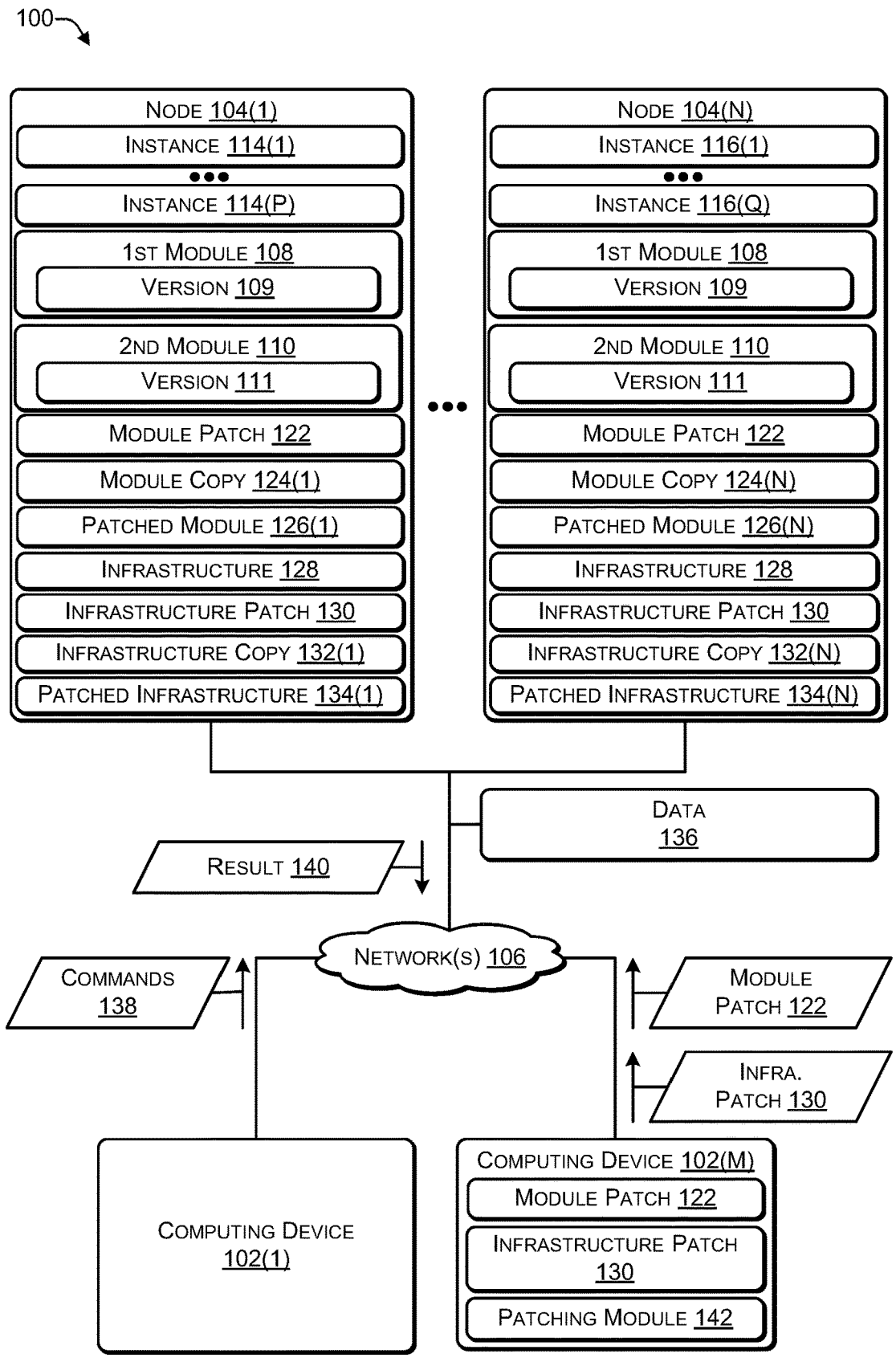
FIG. 1 is a block diagram of a system that includes multiple databases, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a software patch to be applied to multiple databases in a system in a way that significantly reduces the amount of downtime, e.g., the amount that the multiple databases are offline, while being patched. A database may include (1) data stored in the database using one or more data structures and (2) a data management module. The data management module may include executable software code (e.g., referred to as a binary) that receives one or more commands, executes the commands on the data in the database, and returns a result of executing the commands. For example, the data management module may receive a write command along with a particular data item, determine a location where the particular data item is to be added, add the particular data item to the data in the database, and return a result (e.g., of performing the write command) indicating whether the operation was successful. The data management module may receive a read command to read a value of a particular data item, determine a location in the database of the particular data item, read the value, and provide the value pf the particular data item as the result of performing the read command. The data management module may receive a modify command to modify a value of a particular data item in the database, lookup a location in the database of the particular data item, modify the value of the particular data item, and provide the result (e.g., of performing the modify command) indicating whether the operation was successful. In some cases, each database may use an infrastructure module that provides system support for a database, such as, for example, volume management, file system, and automatic restart capabilities.

The systems and techniques described herein enable each of multiple databases in a database system to be patched with significantly reduced downtime, e.g., without having to suspend operations for all (or most of) the databases in the system. The systems and techniques may be used with a variety of different types of databases systems, including SQL, Oracle®, NoSQL, and the like.

The database system may have multiple nodes. Each node may be a server (e.g., a physical server or a virtual server) that hosts multiple instances of a data management module ("module"). In some cases, some of the multiple instances may be instances (e.g., processes of) a first version of a module and the remaining instances may be instances a second (e.g., a different) version of the module. For example, some instances may be based on version 1.8 of a module and the remaining instances may be based on version 2.0 of the module. Each of the instances may use a software infrastructure that provides various types of functions that the instances can use. For example, the software infrastructure may include scripts to generate reports and the like. In an Oracle® based system, the modules (e.g., executable files compiled from software code) may be stored in an Oracle® Home (OH) directory and the infrastructure binaries may be referred to as Grid Infrastructure (GI). Of course, other database systems may use different terminology to provide the same or similar functionality as OH and GI in an Oracle® system.

A software patch ("patch") may be applied to (i) fix bugs in the software code, (ii) add new features, or both (i) and (ii). A module patch may be applied to a particular version of a module to fix bugs, add new features, or both. An infrastructure patch may be applied to an infrastructure binary to fix bugs, add new features, or both. The systems and techniques described herein enable the module patch and software patch to be applied without suspending all the databases (e.g., without taking all the databases offline), e.g., the patch may be applied while the database continue to process commands.

Each node in the system may include one or more versions of a database management module ("module"). Each node may execute one or more instances of each version of the module. In certain types of databases, such as high availability systems and load-balanced systems, multiple instances distributed across multiple nodes may each access the same data. For example, multiple instances may each access a payroll system, enabling a first instance on a first node to generate a report, a second instance on a second node to respond to a query, and a third instance on a third node to prepare a bi-weekly payroll. The systems and techniques described herein apply a patch to each node in turn. Thus, when a first instance on a first node is shut down for patching, the other instances on the other nodes may continue to perform tasks, such as responding to user commands, running reports, running scripts, and the like. The module instances may make use of infrastructure software (e.g., binary files), e.g., lower-level software that provides system support for each of the module instances, such as, for example, volume management, file system, and automatic restart capabilities.

A computing device executing a patching module may automatically (e.g., without human interaction) apply a module patch to at least some of the modules. The module patch may be designed to be applied to a particular version of a module. For example, a patch for version (V) 2.0 may be applied to nodes that have module V2.0 and not to other module versions, such as module V1.8 and V1.9. The patching module may automatically apply a module patch to each node, in the system, in turn. The patching module may automatically apply an infrastructure patch to the infrastructure software in each node.

To apply a module patch, the patching module may select a node from multiple nodes and store a module patch on the selected node. The patching module may identify which of the modules has a version that matches the version targeted by the module patch. If the patching module determines that the node includes a particular module with a version associated with the module patch, the patching module may make a copy of the particular module, and patch the copy to create a patched module. The patching module may shutdown currently executing instances of the particular module and create (e.g., startup) new instances of the patched module. In this way, the time between shutting down instances associated with a particular module and starting up new instances using the patched module may be a few seconds. When instances of the particular module executing on the selected node are shutdown, other instances executing on other nodes may continue to provide read/write access to the data in the database, thereby reducing downtime to zero.

To apply an infrastructure patch, the patching module may select a node from multiple nodes and store an infrastructure patch on the selected node. The patching module may make a copy of the infrastructure software and patch the copy to create patched infrastructure. Because all instances, regardless of the module version associated with each instance, use the infrastructure software, the patching module may shutdown all currently executing instances (e.g., regardless of the module version), create (e.g., startup) new instances to use the patched infrastructure. In this way, the time between shutting down all instances starting up new instances using the patched infrastructure may be a few seconds. When instances executing on the selected node are shutdown, other instances executing on other nodes may continue to provide read/write access to the data in the database, thereby reducing downtime to zero.

As am example, a computing device may include one or more processors and one or more non-transitory computer readable media storing instructions (e.g., of a patching module) executable by the one or more processors to perform various operations. For example, the operations may include selecting a node from a plurality of nodes. The node may include a first set of (one or more) instances of a first module, a second set of (one or more) instances of a second module, and infrastructure software used by the first set of instances and by the second set of instances. The operations may include copying the infrastructure software to create an infrastructure copy and applying an infrastructure patch to the infrastructure copy to create a patched infrastructure. The operations may include stopping the first set of instances of the first module, stopping the second set of instances of the second module, restarting the first set of instances of the first module to use the patched infrastructure, and restarting the second set of instances of the second module to use the patched infrastructure. The operations may include determining that the patched infrastructure causes an error message, stopping the first set of instances of the first module using the patched infrastructure, stopping the second set of instances of the second module using the patched infrastructure, restarting the first set of instances of the first module to use the infrastructure software, and restarting the second set of instances of the second module to use the infrastructure software. The infrastructure software may provide volume management, file system management, and automatic restart to the first set of instances and to the second set of instances.

The operations may include determining that a module patch applies to the first module, copying the first module to create a first copy, and applying the module patch to the first copy to create a patched module. The operations may include stopping the first set of instances of the first module and starting a third set of instances of the patched module. Applying the module patch to the first copy to create the patched module may include replacing at least a portion of executable code included in the first copy with an updated portion of the executable code to create the patched module. The operations may include determining that the patched module causes an error message, stopping the third set of instances of the patched module, and starting a fourth set of instances of the first module. Determining that the module patch applies to the first module may include determining a version of the first module and determining that the module patch applies to the version of the first module.

FIG. 1 is a block diagram of a system 100 that includes multiple databases, according to some embodiments. In the system 100, one or more computing devices, such as computing devices 102(1) to 102(M) (where M>0), may be communicatively coupled to nodes 104(1) to 104(N) (where N>0) via a network 106. The nodes 104 may be standalone servers, cloud-based servers, or a combination of both.

Some of the computing devices 102, such as the computing device 102(1), may send one or more commands 138 to a particular node 104(N). For example, the commands 138 may include one or more operations to be performed to on a database, such as a read operation, a write operation, a modify operation, or any combination thereof. In this example, after an instance 116 of the first management module 108 has performed the commands 138 to the database, the instance 116 of the first management module 108 may return a result 140 of performing the commands 138. For example, the result 140 may include an indication whether the commands 138 were successfully performed and a result of performing the commands. To illustrate, a read operation may return one or more data values read from the database, a write operation may indicate whether the write was successful (e.g., "An entry for Mr. Smith was successfully added to the employee table and the fields for the entry were successfully populated"), a modify operation may indicate whether a portion of the database was successfully modified (e.g., "The salary for Mr. Smith in the employee salary table was successfully modified"), and the like.

Each of the nodes 104 maybe a physical server, a cloud-based server, or multiple servers. The node 104(1) may include a first module 108 having a version 109 (e.g., module V1.9) and a second module 110(1) having a version 111(1) (e.g., module V2.0). For example, the first module 108 may be an executable file used to manage data 136 in a database. The modules 108, 110 may read data from a database, write data to a database, or modify existing data in a database. For example, the version 109 may indicate which version of the software the first module 108 is executing and the version 111(1) may indicate which version of the software the second module 110(1) is executing. The node 104(1) may execute one or more instances of the first module 108, the second module 111(1), or both. For example, the node 104 may execute multiple instances of a database management module, such as instance 114(1) through instance 114(P), (where P>0). The instances 114 may be instances of the first module 108, the second module 110(1), or both.

The node 104(N) may include a first module 106(N) having a version 109 and a second module 110(N) having a version 111(N). The node 104(N) may execute multiple instances, including one or more instances of the first module 108 and one or more instances of the second module 110(N). For example, the node 104(N) may execute instances 116(1) through 116(Q) (where Q>0, Q not necessarily equal to P).

The instances 114, 116 may manage the data 136 associated with multiple databases. For example, the instance 114(1) and the instance 116(1) may both manage the same database in the data 136. Such an arrangement may be done for high availability and/or redundancy. For example, if the instance 114(1) is busy executing a script to prepare a report, the instance 116(1) may respond to the commands 138 sent from the computing device 102(1). In this way, the instances 114(1), 116(1) may perform load balancing.

Each of the nodes 104 may include an infrastructure 128 (e.g., infrastructure software binaries) that is used by the instances 114, 116. For example, the node 104(1) may include the infrastructure 128 and the node 104(N) may include the infrastructure 128. The infrastructure 128 may provide system support to the instances 114 and the infrastructure 128 may provide system support to the instances 116.

One of the computing devices 102, such as the computing device 102(M), may include a patching module 142. The patching module 142 may include software code that is executable by the computing device 102(M) to automatically (e.g., without human interaction) patch modules and/or infrastructure on each of the nodes 104. The computing device 102(M) may include a module patch 122 and an infrastructure patch 130.

To patch a module on one of the nodes 104, the patching module 142 may select a node, such as, for example, the node 104(1). The patching module 142 may store the module patch 122 on the node 104(1). The patching module 142 may determine, based on the versions 109, 111(1) whether the modules 108, 110(1) are compatible with the module patch 122. For example, the module patch 122 may be designed for a specific version of a module, such as the version 109 of the first module 108. In this example, the patching module 142 may identify which of the modules 108, 110(1) are designed to be patched with the module patch 122. For example, assume that the module patch 122 is associated with the version 109 of the first module 108 and the patching module 142 determines the module patch 122 is designed for the first module 108 with the version 109. The patching module 142 may make a copy of the first module 108 to create a module copy 124(1). The patching module 142 may apply the module patch 122 to the module copy 124(1) to create a patched module 126(1). The patching module 142 may shut down those of the instances of 114 associated with the first module 108. The patching module 142 may start up new instances using the patched module 126(1). During the time that at least some of the instances 114 are stopped and the new instances are started, one or more of the instances 114, 116 may continue to manage the data 136. For example, during this time, the instance 116(1) may process the commands 138 and return the result 140. In this way, the data in the database remains accessible, thereby reducing downtime incurred during patching to almost zero. Both the first module 108 and the patched module 126(1) may remain stored on the node 104(1). For example, if instances 114 associated with the patched module 126(1) are determined to have errors because they cause problems (e.g., corrupt data, incorrect results, and the like), then the node 104(1) may revert back to using instances of the first module 108 by shutting down instances of the patched module 126(1) and starting new instances using the first module 108. In addition, some databases in the data 136 may continue to use instances of the first module 108 while others may use instances of the patched module 126(1). In this way, the module patch 122 may be applied at a time when it is convenient for those using a particular database being managed by the instances 114. After applying the module patch 122 to one or more of the modules 108, 110, the patching module 142 may select a next node in the system 100 and apply the module patch 122 to the modules in the selected node.

As another example, assume that the module patch 122 is associated with the version 111(1) of the second module 111(1). In this example, the patching module 142 may determine that the module patch 122 is designed to be applied to the version 111(1) of the second module 110(1). The patching module 142 may copy the second module 110(1) to create the module copy 124(1). The patching module 142 may apply the module patch 122 to the module copy 124(1) to create the patched module 126(1). The patching module 142 may stop those of the instances 114 associated with the second module 110(1) and startup new instances of the patched module 126(1). During the time that at least some of the instances 114 are stopped and the new instances are started, one or more of the instances 114, 116 may continue to manage the data 136. For example, during this time, the instance 116(1) may process the commands 138 and return the result 140. In this way, the data in the database remains accessible, thereby reducing downtime incurred during module patching to almost zero. Both the second module 110 and the patched module 126(1) may remain stored on the node 104(1). For example, if instances 114 associated with the patched module 126(1) are determined to have errors or cause problems (e.g., corrupt data, incorrect results, and the like), then the node 104(1) may revert back to using instances of the second module 110 by shutting down instances of the patched module 126(1) and starting new instances using the second module 110. After applying the module patch 122 to one or more of the modules 108, 110, the patching module 142 may select a next node in the system 100 and apply the module patch 122 to the modules in the selected node.

Copying either of the modules 108, 110 to create the module copy 124 and patching the module copy 124 to create the patched module 126 may be performed substantially simultaneously (e.g., in parallel) across the nodes 104(1) to 104(N), e.g., by executing a script on each of the nodes 104. The process of shutting down instances 114 associated with one of the modules 108, 110 and starting up new instances using the patched module 126 may be done in a serial manner, e.g., by select a first node of the nodes 104, stopping instances 114 and starting up new instances 114 using the patched module 126, then selecting a next node, and so on.

The patching module 142 may patch the infrastructure 128 using the infrastructure patch 130. For example, the patching module 142 may select a node, such as the node 104(1), and store (e.g., copy) the infrastructure patch 130 to the node 104(1). The patching module 142 may make a copy of the infrastructure 128 to create an infrastructure copy 132(1). The patching module 142 may apply the infrastructure patch 130 to the infrastructure copy 132(1) to create the patched infrastructure 134(1). Because all of the instances 114 use the infrastructure 128, the patching module 142 may stop all of the instances 114 and restart the instances 114 in such a way that the instances 114 access the patched infrastructure 134(1) instead of the infrastructure 128. During the time that the instances 114 are stopped and the new instances are started, one or more of the instances 116 may continue to manage the data 136. For example, during the time that infrastructure patch 130 is being applied to the infrastructure 128, the instance 116(1) may process the commands 138 and return the result 140. In this way, the data in the database remains accessible, thereby reducing downtime incurred during infrastructure patching to almost zero. Both the infrastructure 128 and the patched infrastructure 134(1) may remain stored on the node 104(1). For example, if the patched infrastructure 134(1) is determined to have errors or cause problems (e.g., corrupt data, incorrect results, and the like), then the node 104(1) may revert back to using the infrastructure 128. After applying the infrastructure patch 130 to the infrastructure 128, the patching module 142 may select a next node in the system 100 and apply the infrastructure patch 130 to the infrastructure 128 in the selected node.

A manufacturer of the database software may release the patches 122, 130, on different dates or on the same date. If the manufacturer releases the module patch 122, the patching module 142 may apply the module patch 122 to modules on one or more of the nodes 104 in the system 100. If the manufacturer releases the infrastructure patch 130, the patching module 142 may apply the infrastructure patch 130 to the infrastructure 128 on one or more of the nodes 104 in the system 100. If both the module patch 122 and the infrastructure patch 130 are to be applied to one or more of the nodes 104, such as the node 104(N), then the infrastructure patch 130 may be applied to the node 104(N) before applying the module patch 122. This order may be used because the module patch 122 may use features present in the infrastructure patch 130 but not present in the infrastructure 128.

Thus, multiple instances on multiple nodes may manage a database. To apply a module patch in a system of multiple nodes, a patching module may select a node in the system and copy the module patch to the selected node. The patching module may identify to which particular module the module patch applies, create a copy of the particular module, and patch the copy to create a patched module. The patching module may stop instances of the particular module and startup new instances of the patched module. During this time, other instances executing on other nodes may continue to manage the data in the database, enabling the database to continue to be accessed and updated while the patching process takes place. The patching module may then select a next node and apply the module patch and so on until all nodes in the system have been selected.

To apply an infrastructure patch, the patching module may select a node in the system and copy the infrastructure patch to the selected node. The patching module may create a copy of the infrastructure and patch the copy to create a patched infrastructure. The patching module may stop all instances that were using the infrastructure and startup new instances using the patched infrastructure. During this time, other instances executing on other nodes may continue to manage the data in the database, enabling the database to continue to be accessed and updated while the patching process takes place. The patching module may select a next node and apply the infrastructure patch and so on until all nodes in the system have been selected.

Figure 2:
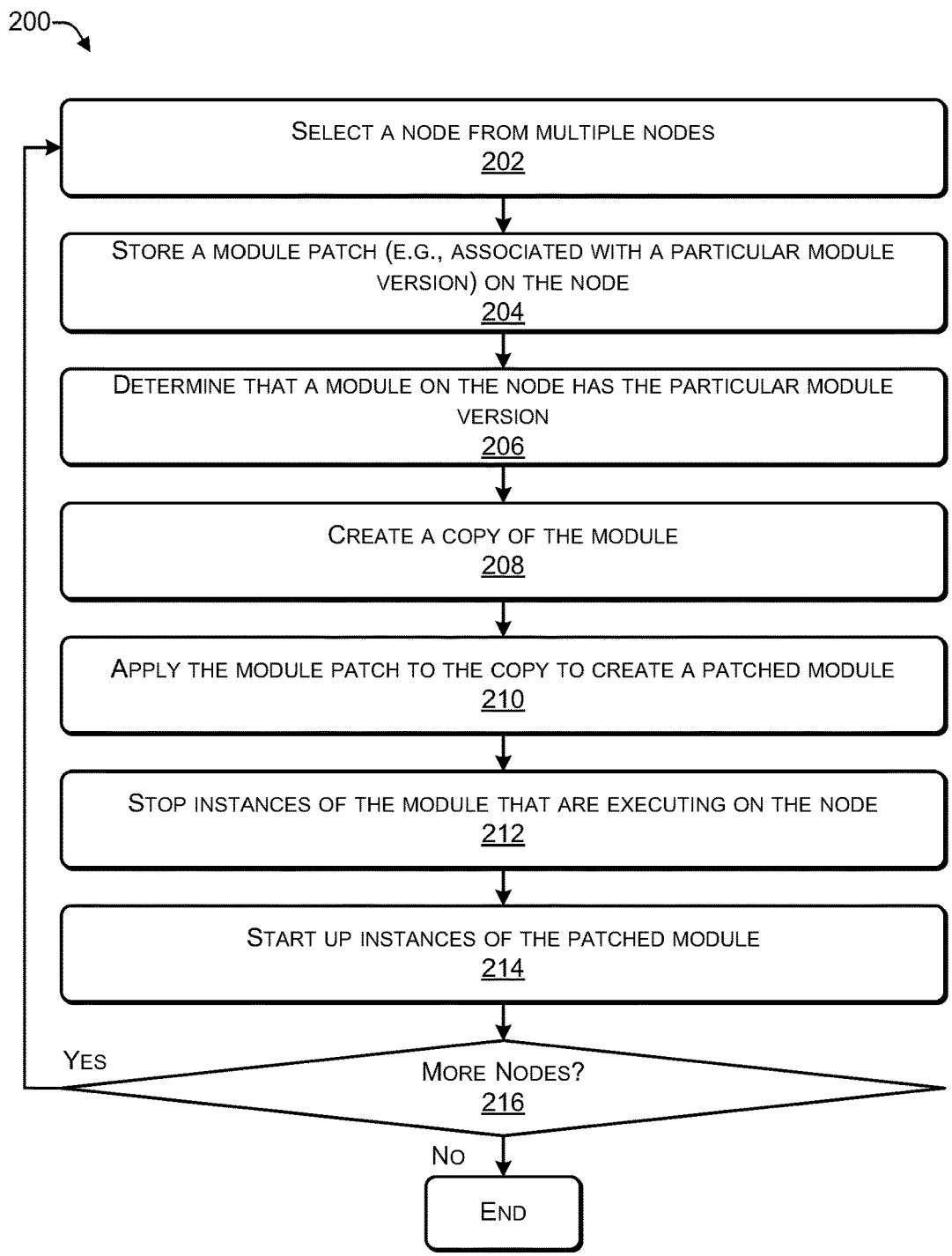
FIG. 2 is a flowchart of a process that includes applying a module patch, according to some embodiments.
Figure 3:
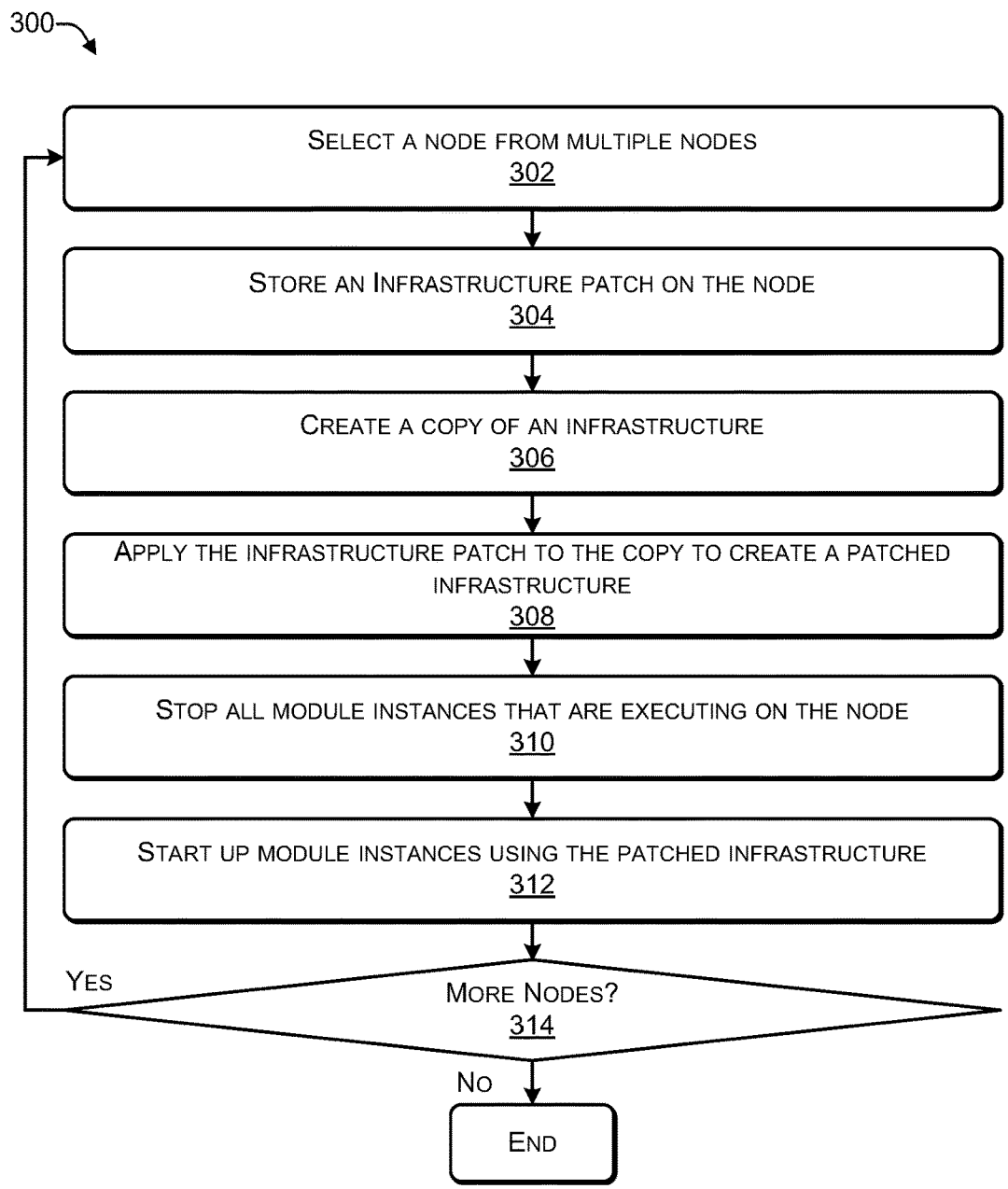
FIG. 3 is a flowchart of a process that includes applying an infrastructure patch, according to some embodiments.

In the flow diagram of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1, as described above, although other models, frameworks, systems and environments may be used to implement these processes.

FIG. 2 is a flowchart of a process 200 that includes applying a module patch, according to some embodiments. For example, the process 200 may be performed by the patching module 142 of FIG. 1.

At 202, a node may be selected from multiple nodes. At 204, a module patch associated with a particular module version may be stored on the node. At 206, a determination maybe made that a module on the node has the particular module version. At 208, a copy of the module may be created. At 210, the module patch may be applied to the copy of the module to create a patched module. For example, in FIG. 1, the patching module 142 may select a node, such as, for example, the node 104(1). The patching module 142 may store the module patch 122 on the node 104(1). The patching module 142 may identify which of the modules 108, 110(1) are designed to be patched with the module patch 122. For example, assume that the patching module 142 determines the module patch 122 is designed for the first module 108 with the version 109. The patching module 142 may make a copy of the first module 108 to create a module copy 124(1). The patching module 142 may apply the module patch 122 to the module copy 124(1) to create a patched module 126(1).

At 212, instances of the module that are executing on the node may be stopped. At 214, instances of the patched module maybe started up. At 216, a determination may be made whether there are more nodes on which to apply the module patch. If a determination is made, at 216, that there are no more nodes to be patched, then the process may end. If a determination is made, at 216, that there are more nodes to be patched, then the process may proceed back to 202 where a next node may be selected from the multiple modes. For example, in FIG. 1, the patching module 142 may shut down those of the instances of 114 associated with the first module 108 and start up new instances 114 using the patched module 126(1). The patching module 142 may select a next node and repeat the process 200. The process 200 may be repeated until all nodes in the system have been selected.

In FIG. 1, copying either of the modules 108, 110 to create the module copy 124 and patching the module copy 124 to create the patched module 126 may be performed substantially simultaneously (e.g., in parallel) across the nodes 104(1) to 104(N), e.g., by having each of the nodes 104 execute a script on each of the nodes 104. The process of shutting down instances 114 associated with one of the modules 108, 110 and starting up new instances using the patched module 126 may be done in a serial manner, e.g., by select a first node of the nodes 104, stopping instances 114 and starting up new instances 114 using the patched module 126, then selecting a next node, and so on.

FIG. 3 is a flowchart of a process that includes applying a infrastructure patch to a copy of an infrastructure, according to some embodiments. For example, the process 300 may be performed by the patching module 142 of FIG. 1.

At 302, a node may be selected from multiple nodes. At 304, an infrastructure patch may be stored on (e.g., copied to) the node. At 306, a copy of the infrastructure may be created. At 308, the infrastructure patch may be applied to the copy of the infrastructure to create a patched infrastructure. The patching module 142 may patch the infrastructure 128 using the infrastructure patch 130. For example, in FIG. 1, the patching module 142 may select a node, such as the node 104(1), and store (e.g., copy) the infrastructure patch 130 to the node 104(1). The patching module 142 may make a copy of the infrastructure 128 to create an infrastructure copy 132(1). The patching module 142 may apply the infrastructure patch 130 to the infrastructure copy 132(1) to create the patched infrastructure 134(1).

At 310, all instances executing on the node may be stopped. At 312, instances of the patched module maybe started up using the patched infrastructure. At 314, a determination may be made whether there are more nodes on which to apply the infrastructure patch. If a determination is made, at 314, that there are no more nodes to be patched, then the process may end. If a determination is made, at 314, that there are more nodes to be patched, then the process may proceed back to 302 where a next node may be selected from the multiple modes. For example, in FIG. 1, all of the instances 114 use the infrastructure 128. Therefore, the patching module 142 may stop all of the instances 114 using the infrastructure 128 and restart the instances 114 using the patched infrastructure 134(1) (e.g., instead of the infrastructure 128). After applying the infrastructure patch 130 to the infrastructure 128, the patching module 142 may select a next node in the system 100 and apply the infrastructure patch 130 to the infrastructure 128 in the selected node. The process 300 may be repeated until all nodes in the system have been selected.

In FIG. 1, copying the infrastructure 128 to create the infrastructure copy 132 and patching the infrastructure copy 132 to create the patched infrastructure 134 may be performed substantially simultaneously (e.g., in parallel) across the nodes 104(1) to 104(N), e.g., by having each of the nodes 104 execute a script on each of the nodes 104. The process of shutting down instances 114 using the infrastructure 128 and starting up new instances 114 that use the patched infrastructure 134 may be done in a serial manner, e.g., by select a first node of the nodes 104, stopping instances 114 and starting up new instances 114 using the patched infrastructure 134, then selecting a next node, and so on until all nodes have been selected.

Figure 4:
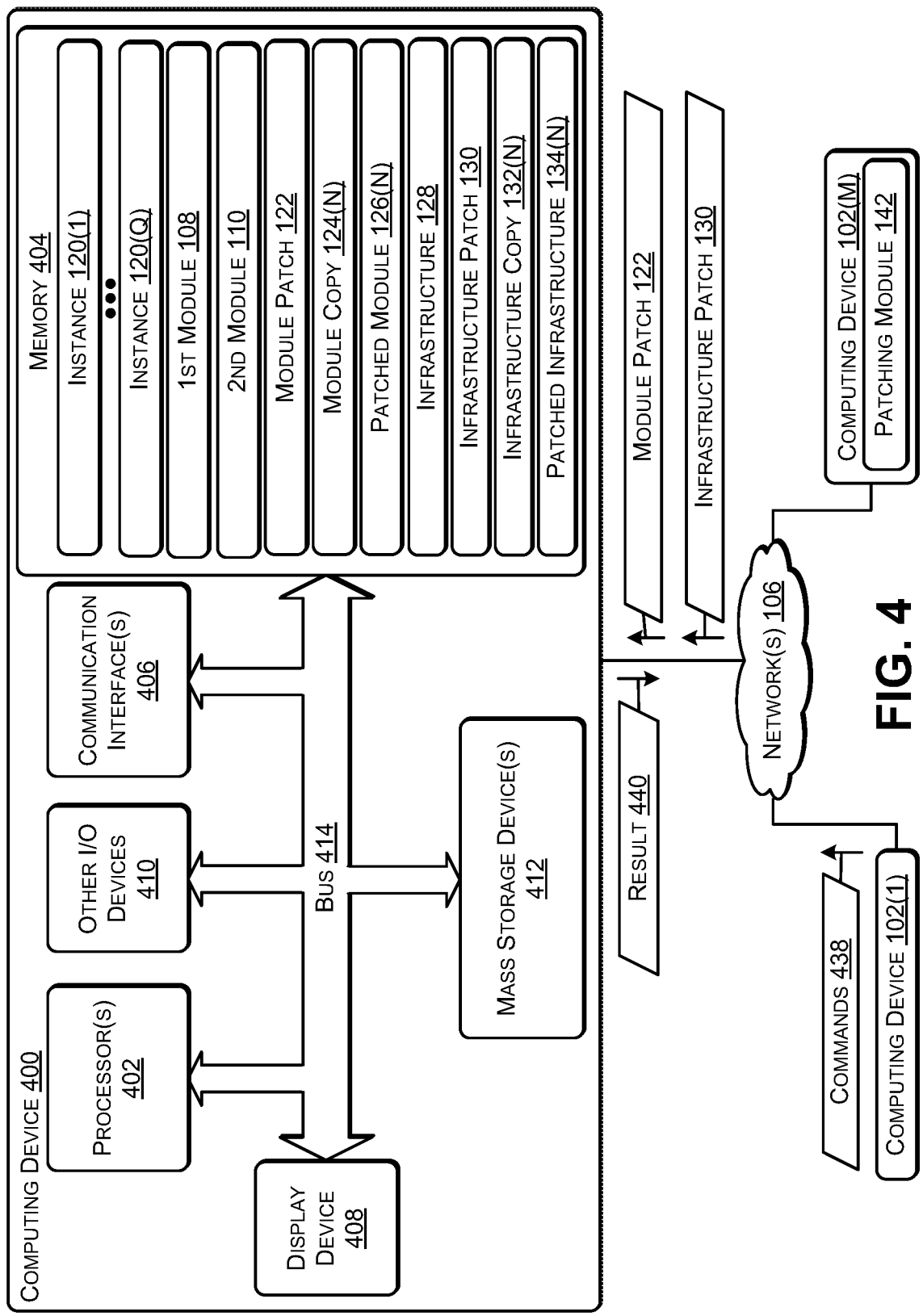
FIG. 4 illustrates an example configuration of a computing device that can be used to implement the systems and techniques described herein.

FIG. 4 illustrates an example configuration of a computing device 400 that can be used to implement the systems and techniques described herein, such as for example, the computing devices 102 and the nodes 104 of FIG. 1. For illustration purposes, the computing device 400 is illustrated in FIG. 4 as implementing the node 104(N) of FIG. 1.

The computing device 400 may include one or more processors 402 (e.g., CPU, GPU, or the like), a memory 404, communication interfaces 406, a display device 408, other input/output (I/O) devices 410 (e.g., keyboard, trackball, and the like), the sensors 206, and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 116 and mass storage devices 412, may be used to store software and data. For example, the computer storage media may be used to store the modules 108, 110, the infrastructure 128, as illustrated in FIG. 4.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
concurrently executing, on a plurality of nodes, a first set of instances of a first data management module, a second set of instances of a second data management module, and infrastructure software used by the first set of instances and second set of instances; wherein
the first set of instances of the first data management module, and the second set of instances of the second data management module on the plurality of nodes are configured to execute data management operations on one or more common databases;
selecting, by one or more processors, a node from the plurality of nodes;
using the one or more processors to make a duplicate copy of the infrastructure software on the selected node to create an infrastructure software copy on the selected node;
applying, by the one or more processors, an infrastructure patch to the infrastructure software copy on the selected node to create a patched infrastructure software on the selected node, wherein the infrastructure software is used by the first set of instances of the first data management module and the second set of instances of the second data management module while the infrastructure patch is applied to the infrastructure software copy on the selected node;
stopping, by the one or more processors, the first set of instances of the first data management module on the selected node while continuing execution of the first set of instances of the first data management module on one or more other nodes of the plurality of nodes;
stopping, by the one or more processors, the second set of instances of the second data management module on the selected node while continuing execution of the second set of instances of the second data management module on one or more other nodes of the plurality of nodes; and
after stopping the first set of instances of the first data management module and the second set of instances of the second data management module on the selected node:
restarting, by the one or more processors, the first set of instances of the first data management module on the selected node to use the patched infrastructure software on the selected node; and
restarting, by the one or more processors, the second set of instances of the second data management module on the selected node to use the patched infrastructure software on the selected node.

2. The method of claim 1, further comprising:
determining that the patched infrastructure software on the selected node causes an error message;
stopping the first set of instances of the first data management module using the patched infrastructure software on the selected node;
stopping the second set of instances of the second data management module using the patched infrastructure software on the selected node;
restarting the first set of instances of the first data management module to use the infrastructure software on the selected node; and
restarting the second set of instances of the second data management module to use the infrastructure software on the selected node.

3. The method of claim 1, wherein:
the infrastructure software provides system support for the first and second data management modules.

4. The method of claim 1, further comprising:
determining that a module patch applies to the first data management module on the selected node;
copying the first data management module to create a copy of the first data management module on the selected node;
applying the module patch to the copy of the first data management module on the selected node to create a patched first data management module;
stopping the first set of instances of the first data management module on the selected node; and
starting a third set of instances of the patched first data management module on the selected node.

5. The method of claim 4, wherein applying the module patch to the copy of the first data management module to create the patched first data management module comprises:
replacing at least a portion of executable code included in the copy of the first data management module with an updated portion of the executable code to create the patched first data management module.

6. The method of claim 4, further comprising:
determining that the patched first data management module causes an error message;
stopping the third set of instances of the patched first data management module; and
starting a fourth set of instances of the first data management module.

7. The method of claim 4, wherein determining that the module patch applies to the first data management module comprises:
determining a version of the first data management module; and
determining that the module patch applies to the version of the first data management module.

8. A computing device comprising:
one or more processors; and
one or more non-transitory computer readable media storing instructions executable by the one or more processors to perform operations comprising:
concurrently executing, on a plurality of nodes, a first set of instances of a first data management module, a second set of instances of a second data management module, and infrastructure software used by the first set of instances and second set of instances; wherein
the first set of instances of the first data management module, and the second set of instances of the second data management module on the plurality of nodes are configured to execute data management operations on one or more common databases;
selecting a node from the plurality of nodes;
copying the infrastructure software that is on the selected node to create an infrastructure software copy on the selected node;
applying an infrastructure patch to the infrastructure software copy on the selected node to create a patched infrastructure software on the selected node, wherein the infrastructure software is used by the first set of instances of the first data management module and the second set of instances of the second data management module while the infrastructure patch is applied to the infrastructure software copy on the selected node;

stopping the first set of instances of the first data management module on the selected node while continuing execution of the first set of instances of the first data management module on one or more other nodes of the plurality of nodes;

stopping the second set of instances of the second data management module on the selected node while continuing execution of the second set of instances of the second data management module on one or more other nodes of the plurality of nodes;

after stopping the first set of instances of the first data management module and the second set of instances of the second data management module on the selected node:

automatically restarting the first set of instances of the first data management module on the selected node to use the patched infrastructure software on the selected node; and automatically restarting the second set of instances of the second data management module on the selected node to use the patched infrastructure software on the selected node.

9. The computing device of claim 8, wherein the operations further comprise:

determining that the patched infrastructure software on the selected node causes an error message;

stopping the first set of instances of the first data management module using the patched infrastructure software on the selected node;

stopping the second set of instances of the second data management module using the patched infrastructure software on the selected node;

restarting the first set of instances of the first data management module to use the infrastructure software on the selected node; and restarting the second set of instances of the second data management module to use the infrastructure software on the selected node.

10. The computing device of claim 8, wherein the operations further comprise:

determining that a module patch applies to the first data management module on the selected node;

copying the first data management module on the selected node to create a of the first data management module on the selected node;

applying the module patch to the copy of the first data management module on the selected node to create a patched first data management module;

stopping the first set of instances of the first data management module on the selected node; and starting a third set of instances of the patched first data management module.

11. The computing device of claim 10, wherein applying the module patch to the copy of the first data management module to create the patched first data management module comprises:

replacing at least a portion of executable code included in the copy of the first data management module with an updated portion of the executable code to create the patched first data management module.

12. The computing device of claim 10, wherein the operations further comprise:

determining that the patched first data management module causes an error message;

stopping the third set of instances of the patched first data management module; and starting a fourth set of instances of the first data management module.

13. The computing device of claim 10, wherein determining that the module patch applies to the first data management module comprises:

determining a version of the first data management module; and determining that the module patch applies to the version of the first data management module.

14. One or more non-transitory computer readable media storing instructions executable by one or more processors to perform operations comprising:

concurrently executing, on a plurality of nodes, a first set of instances of a first data management module, a second set of instances of a second data management module, and infrastructure software used by the first set of instances and second set of instances; wherein the first set of instances of the first data management module, and the second set of instances of the second data management module on the plurality of nodes are configured to execute data management operations on one or more common databases;

selecting a node from the plurality of nodes;

copying the infrastructure software on the selected node to create an infrastructure software copy on the selected node;

applying an infrastructure patch to the infrastructure software copy on the selected node to create a patched infrastructure software on the selected node, wherein the infrastructure software is used by the first set of instances of the first data management module and the second set of instances of the second data management module while the infrastructure patch is applied to the infrastructure software copy on the selected node;

stopping the first set of instances of the first data management module on the selected node while continuing execution of the first set of instances of the first data management module on one or more other nodes of the plurality of nodes;

stopping the second set of instances of the second data management module on the selected node while continuing execution of the second set of instances of the second data management module on one or more other nodes of the plurality of nodes;

after stopping the first set of instances of the first data management module and the second set of instances of the second data management module on the selected node:

restarting, by the one or more processors, the first set of instances of the first data management module on the selected node to use the patched infrastructure software on the selected node; and restarting, by the one or more processors, the second set of instances of the second data management module on the selected node to use the patched infrastructure software on the selected node.

15. The one or more non-transitory computer readable media of claim 14, wherein the operations further comprise:

determining that the patched infrastructure software on the selected node causes an error message;

stopping the first set of instances of the first data management module using the patched infrastructure software on the selected node;

stopping the second set of instances of the second data management module using the patched infrastructure software on the selected node;

restarting the first set of instances of the first data management module to use the infrastructure software on the selected node; and restarting the second set of instances of the second data management module to use the infrastructure software on the selected node.

16. The one or more non-transitory computer readable media of claim 14, wherein:

the infrastructure software provides volume management, file system management, and automatic restart to the first set of instances and to the second set of instances.

17. The one or more non-transitory computer readable media of claim 14, further comprising:

determining that a module patch applies to the first data management module;

copying the first data management module at the selected node to create a copy of the first data management module at the selected node;

applying the module patch to the copy of the first data management module at the selected node to create a patched module of the first data management module at the selected node;

stopping the first set of instances of the first data management module; and starting a third set of instances of the patched module of the first data management module at the selected node.

18. The one or more non-transitory computer readable media of claim 17, wherein applying the module patch to the copy of the first data management module to create the patched first data management module comprises:

replacing at least a portion of executable code included in the copy of the first data management module with an updated portion of the executable code to create the patched first data management module.

19. The one or more non-transitory computer readable media of claim 17, the operations further comprising:

determining that the patched first data management module causes an error message;

stopping the third set of instances of the patched first data management module; and starting a fourth set of instances of the first data management module.

20. The one or more non-transitory computer readable media of claim 17, wherein determining that the module patch applies to the first data management module comprises:

determining a version of the first data management module; and determining that the module patch applies to the version of the first data management module.

* * * * *